Figure 1:
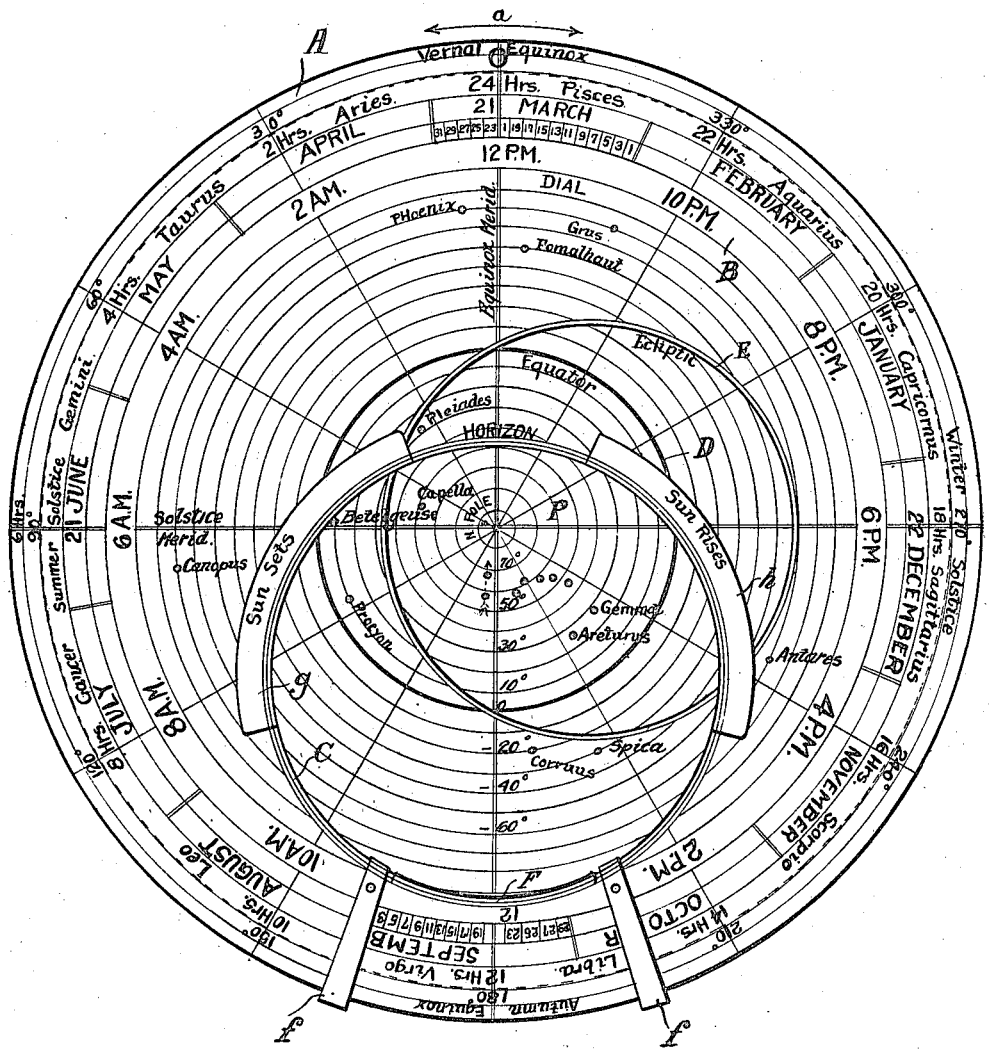

July 17, 1923.

C. W. COMPTON

STAR NAMER

Filed Aug. 18, 1922

1,462,323

2 Sheets—Sheet 1

Inventor:
Charles W. Compton
By Hiram Swartz, Atty.

July 17, 1923.
C. W. COMPTON
STAR NAMER
Filed Aug. 18, 1922
1,462,323
2 Sheets-Sheet 2
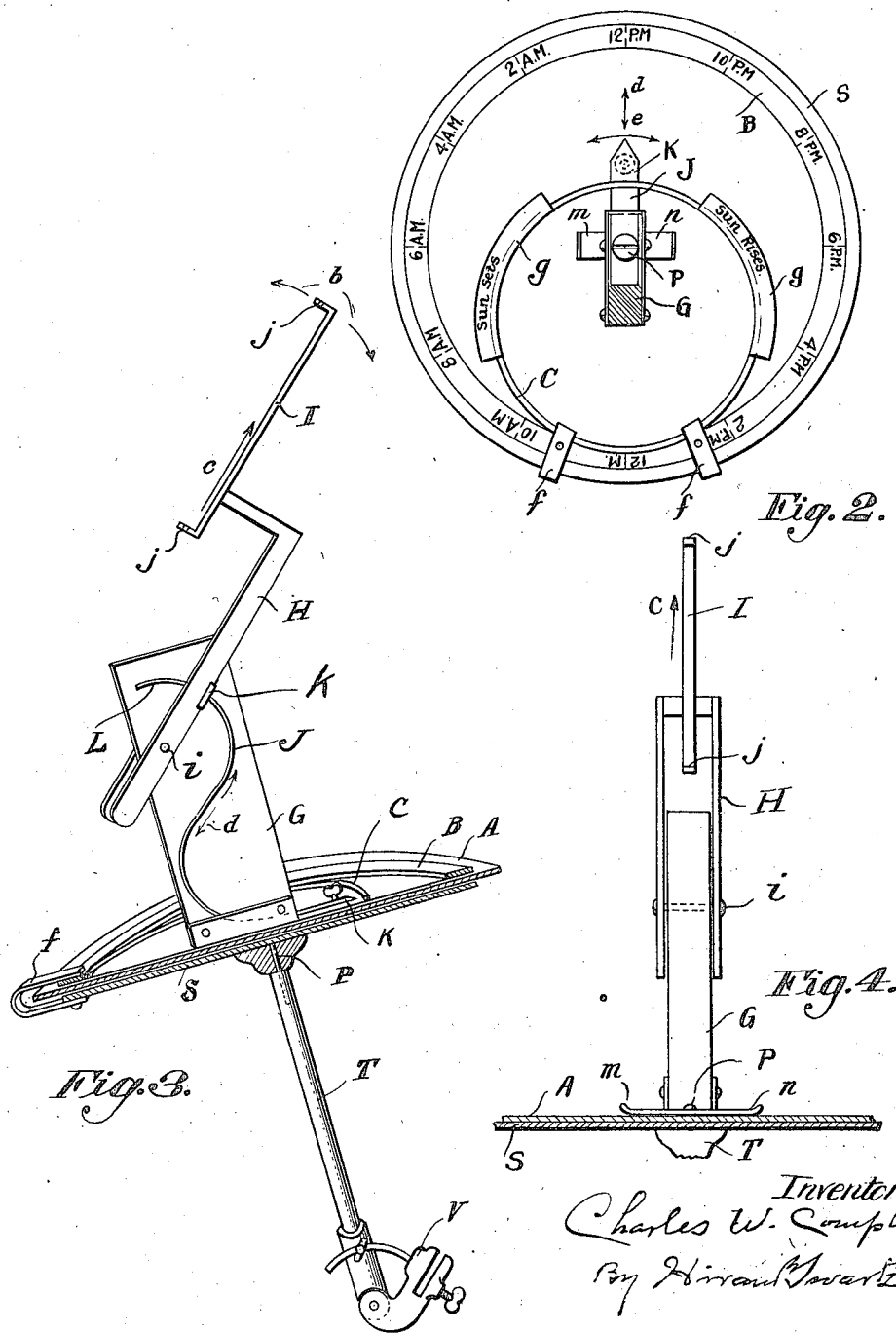

Patented July 17, 1923.

1,462,323

UNITED STATES PATENT OFFICE.

CHARLES W. COMPTON, OF WOOSTER, OHIO.

STAR NAMER.

Application filed August 18, 1922. Serial No. 582,769.

*To all whom it may concern:*

Be it known that I, CHARLES W. COMPTON, a citizen of the United States, residing at Wooster, in the county of Wayne and State of Ohio, have invented a new and useful Star Namer, of which the following is a specification.

My invention relates to starnamers, or devices for pointing out stars and constellations in the heavens and objects visible in the celestial hemisphere—and its principal objects are to provide a simple, efficient and inexpensive device for pointing out stars in the sky that are named on a map, or planosphere of the sky as seen at night, and to indicate stars and other astronomical objects to be seen in the sky, and by means of a celestial map and a pointer, to point out the location and boundaries of constellation figures—such as mythological animals—and indicate the course of the sun, stars and planets on each day of the year, and find the time, approximately at any time; to mark out the parallels and meridians of the celestial sphere, and determine approximate latitude from the position of the sun and stars; and to point out any object in the sky whose declination and right ascension is given.

It consists mainly of a rotary siderial map mounted upon a platform, supported at any desired angle or inclination upon a rod which is perpendicular thereto, and held at its base by a suitable grip to any desired position, in combination with a rotary standard at right angles with the plane of the map, and a shiftable pointer mounted upon the standard, the direction of which is movably fixed by means of a flexible band operable in the standard, and adapted to be manually drawn to any desired point on the map, whereby the pointer is automatically directed toward the same object in the heavens—all as hereinafter fully set forth and stated in the appended claim.

My invention is illustrated by the accompanying drawings in which similar letters and figures of reference indicate like parts.

Referring thereto, Fig. 1 is a plan view of an inverted map showing the usual indicia of maps of the celestial hemisphere as heretofore constructed for star finding purposes, the pertinence of said map indicia it is not necessary to further explain, as the same are not specifically claimed, except as in combination with the novel features more particularly set forth herein; Fig. 2 is a plan view showing the platform on which the map is to be mounted and rotated, the stationary dial, and horizon ring, and cross section of the standard; Fig. 3 is a side view of the entire device, showing the map in cross section; and Fig. 4 is front view of the standard and pointer mechanism, and map and platform in section, on which the standard rotates.

In the drawings, A is a circular rotary disk on which is drawn the map of a celestial hemisphere, such as I use for pointing out the stars and other objects in the sky, the indicia thereon being inverted, so as to be viewed from above the map and looking down thereon, instead of being placed upside down over the head of the observer, as heretofore required in planosphere maps to locate star positions. It is to be read as an earth map, each star being represented by point marked beneath it to which the observer looks down, and such inverted map is one of the novel elements which I claim, but the indicia thereon, except as modified by inversion, are disclaimed. Accordingly, around the outer portion of the map disk are marked in reverse order, the hours of the day at regular intervals from 1 to 24, and the degrees of longitude from 0 to 360, with meridians drawn from the polar center P, the equinoctial meridian being drawn for March 21st and September 22, and the summer and winter solstice meridian for June 21 and December 22, as usual; and the several months of the year are spaced between meridians in inverted order accompanied with the usual signs of the zodiac, and the days of each month are spaced apart (as shown for March and September in Fig. 1) with reference to the meridians, respectively. Other meridians may be drawn on the map, and indicia appropriate thereto.

On the disk map, the earth's equator position is indicated by the circle D, and the ecliptic, or path of the sun, by the letter E, said circles crossing each other on the equinoctial meridian, and farthest apart at the crossing of the solstice meridian, the pole star being a short distance from the pole P, and the well known "dipper" constellation properly located south therefrom at the date and time shown on the map, for illustration merely. Other well known stars are also indicated on the drawing for like purpose, all in inverse order to correspond with the plan of the map such as I use with the pointer I, shown in Fig. 3. Other stars and celestial objects may be placed on the map to complete the same for use. The map disk is mounted removably upon a stationary platform S, and the indicia thereon may be changed to suit the geography of the heavens under survey. The disk rotates upon a pivot at the polar center, and underneath the dial ring B and the horizon ring C, manually, both of which are stationary with reference to the disk, as hereafter explained. The position of the sun is supposed to be above the horizon within the horizon circle.

C indicates the horizon on the map, and is preferably in form of a ring, and provided with attached spaces $g$ and $h$ on opposite sides for indicia as to the rising and setting of the sun at different points of the ecliptic E, which points it is not necessary to show herein, as the same will be readily understood, by rotation of the map disk while the horizon ring C is stationary, it being solidly attached to the dial ring B, at F; both said members being solidly connected with the stationary platform S by supporting strips $f$ $f$, best shown in Fig. 3.

It will be understood that only one hemisphere of the sky is visible at a time, the exposed length of the celestial meridians from pole to pole being 180°, and the horizon ring C leaves open the space within this ring, representing a diameter equal to the length of 180° meridian on the map, and one point within this circle is placed at the point of observation, which for ordinary latitude is about 40° south of the north star, which is its angle above the north horizon, and this point marking the center of the horizon ring, will vary with the latitude of the observer. Accordingly, the turn of the map disk causes the hour of the night to coincide with the day of the year, and the stars visible at that time are then within the circle of the dial B; and by turning the map the daily progress of any star from east to west may be seen approximately.

The stationary platform S, (Fig. 3) is supported upon a rod T, which may be set at any desired angle according to the latitude of the observer, by means of the adjustable clamp V, or equivalent means, and the map disk A may be manually rotated in either direction to coincide with the indicia on the dial B, upon the polar axis P, as aforesaid; and on this axis is also mounted a standard G vertically to the plane of the map disk, adapted to be manually rotated thereon in either direction.

A bifurcated arm H is pivotally mounted upon the standard so as to turn thereon in the direction of any of the meridians at pleasure of the operator, upon the pivotal axis $p$; and a sight-rod I is rigidly secured to the outer end of said arm, and provided with suitable sights $j$, $j$, whereby vision is directed along the sight-rod in the direction of the arrow $c$, to the point in the sky which is indicated on the map disk when turned thereto, as hereafter stated. It is apparent that by rotation of the standard G the sight-rod I will swing sidewise in the direction of the arrows $b$ simultaneously therewith.

To secure and limit the vertical swing of the sight-rod, the standard G supports an S shaped groove or track L, a reversed curve in which slides a thin flexible metal band J, the upper end of which band is secured to the arms H at $k$, (Fig. 3), and the lower end K extends outwardly from the base of the standard, terminating with a suitable pointer which may be moved over the map disk in any direction laterally to any star or constellation point indicated thereon, thereby causing the arm H, which is pivoted at the center of the upper semicircle, to swing in either direction vertically, the metal band moving in the track L as shown by the arrow $d$.

The standard G is provided with an extended base $m$, $n$, laterally for support, and the band may be facilitated in operation by means of roller bearings if desired. It will be understood that the upper semicircle is of such a length that when the band is moved its length, to 180° latitude, the pointer I will indicate 180° in the celestial hemisphere, and thus stars and constellation outlines marked on the map disk can be traced in the sky by the pointer, as the indicator K is moved over the outlines shown on the map. For correct observation the support rod T should point to the north pole of the heavens.

Having thus fully described by invention, what I claim as new and desire to secure by Letters Patent is—

In a device of the character described, the combination with a rotatable map disk of a celestial hemisphere, having time and astronomical indicia imprinted thereon, of a stationary platform for said disk to rotate upon, a support rod for said platform adjustable to point to the north pole of the heavens, a dial ring and a horizon ring mounted above said disk independently thereof, in engagement with said platform; a rotatable standard pivoted above said support rod, in line therewith, an arm pivoted on said standard its outer end adapted to swing thereon vertically, a sight-rod or pointer mounted upon said outer end, a reverse S-shaped groove or track on said standard with an arm pivoted at the center of the upper arc thereof, and a flexible metal band mounted on said track, having its upper end in operative engagement with said arm, and its lower or outer end free to extend outwardly from the base of said standard, said outer end being adapted to swing said standard rotarily and to be drawn in and out to points on said map, substantially as set forth and for the purpose specified.

In witness whereof, I hereunto set my hand this 15 day of June, 1922.

CHARLES W. COMPTON.

In presence of two witnesses:—
 HIRAM SWARTZ,
 JOHN C. MCCLARAN.